US010128884B2

(12) United States Patent
Zhao et al.

(10) Patent No.: US 10,128,884 B2
(45) Date of Patent: Nov. 13, 2018

(54) ANTENNA INTERFACE CIRCUIT, DATA CARD, AND ANTENNA CONNECTION CONTROL METHOD AND APPARATUS

(71) Applicant: Huawei Device (Shenzhen) Co., Ltd., Shenzhen (CN)

(72) Inventors: Kun Zhao, Xi'an (CN); Hugen Qin, Xi'an (CN); Yajun Wang, Xi'an (CN); Yuyun Zhai, Xi'an (CN); Hang Lan, Xi'an (CN)

(73) Assignee: HUAWEI DEVICE (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 15/116,777

(22) PCT Filed: Feb. 19, 2014

(86) PCT No.: PCT/CN2014/072225
§ 371 (c)(1),
(2) Date: Aug. 4, 2016

(87) PCT Pub. No.: WO2015/123813
PCT Pub. Date: Aug. 27, 2015

(65) Prior Publication Data
US 2016/0352375 A1    Dec. 1, 2016

(51) Int. Cl.
*H01Q 21/28*    (2006.01)
*H04B 1/18*    (2006.01)
*H04B 7/04*    (2017.01)
*H04B 7/0413*    (2017.01)

(52) U.S. Cl.
CPC ............... *H04B 1/18* (2013.01); *H01Q 21/28* (2013.01); *H04B 7/0413* (2013.01)

(58) Field of Classification Search
CPC ... H04B 7/00; H04B 1/18; H04B 7/04; H01Q 21/28
See application file for complete search history.

(56) References Cited

U.S. PATENT DOCUMENTS

| 2005/0064903 A1 | 3/2005 | Uotsu et al. |
| 2007/0018895 A1 | 1/2007 | Bolin |
| 2007/0142001 A1 | 6/2007 | Sanders |

(Continued)

FOREIGN PATENT DOCUMENTS

| CN | 1599277 A | 3/2005 |
| CN | 1691537 A | 11/2005 |
| CN | 1792041 A | 6/2006 |

(Continued)

*Primary Examiner* — Blane Jackson
(74) *Attorney, Agent, or Firm* — Slater Matsil, LLP

(57) ABSTRACT

A circuit includes a main connector and a single-pole double-throw switch. A common contact of the main connector is used as a port of a main receiver, and a normally-closed contact of the main connector is used as a port of a main antenna. Furthermore, a normally-open contact of the main connector is used as a port of an external antenna, and a common contact of the single-pole double-throw switch is used as a port of a diversity receiver. Additionally, a normally-closed contact of the single-pole double-throw switch is used as port of a diversity antenna, and a normally-open contact of the single-pole double-throw switch is connected to the normally-closed contact of the main connector.

18 Claims, 4 Drawing Sheets

(56) References Cited

U.S. PATENT DOCUMENTS

2011/0105049 A1\* 5/2011 Yamada .............. H04B 7/0697
 455/68
2012/0171977 A1 7/2012 Talty et al.

FOREIGN PATENT DOCUMENTS

| | | |
|---|---|---|
| CN | 101375526 A | 2/2009 |
| CN | 201928508 U | 8/2011 |
| EP | 0556010 A1 | 8/1993 |
| EP | 1460771 A1 | 9/2004 |
| JP | H11251981 A | 9/1999 |

\* cited by examiner

ANTENNA INTERFACE CIRCUIT, DATA CARD, AND ANTENNA CONNECTION CONTROL METHOD AND APPARATUS

CROSS-REFERENCE TO RELATED APPLICATIONS

This patent application is a national phase filing under section 371 of PCT/CN2014/072225, filed on Feb. 19, 2014, which is hereby incorporated herein by reference in its entirety.

TECHNICAL FIELD

The present invention relates to the field of communications technologies, and in particular embodiments, to an antenna interface circuit, a Universal Mobile Telecommunications System data card, and an antenna connection control method and apparatus.

BACKGROUND

In the prior art, a communications system is usually provided with two receivers: a main receiver and a diversity receiver. Interface circuits of antennas of the receivers are shown in FIG. 1. A common contact c0 of a main connector is connected to the main receiver, a normally-closed contact c1 is connected to a main antenna, and a normally-open contact c2 is connected to an external antenna. That is, according to a specific requirement of an actual application scenario, the main receiver may connect to the main antenna or the external antenna, and the diversity receiver can only connect to a diversity antenna. Performance of the external antenna is higher than that of the main antenna, and the performance of the main antenna is higher than that of the diversity antenna.

To ensure MIMO (multiple-input multiple-output) performance of a system, a performance difference between a main receiver and a diversity receiver is usually not expected to be excessively great. However, when the main receiver is connected to an external antenna and the diversity receiver is connected to a diversity antenna, because there is a great performance difference between the external antenna and the diversity antenna, there is also a great performance difference between the main receiver and the diversity receiver, which further affects the MIMO performance of the system.

SUMMARY

Embodiments of the present invention provide an antenna interface circuit to improve MIMO performance of a system.

A first aspect provides an antenna interface circuit, including a main connector and a single-pole double-throw switch. In this aspect, a common contact of the main connector is used as a terminal of a main receiver; a normally-closed contact of the main connector is used as a terminal of a main antenna; and a normally-open contact of the main connector is used as a terminal of an external antenna. Furthermore, a common contact of the single-pole double-throw switch is used as a terminal of a diversity receiver; a normally-closed contact of the single-pole double-throw switch is used as a terminal of a diversity antenna; and a normally-open contact of the single-pole double-throw switch is connected to the normally-closed contact of the main receiver. In this aspect, when the common contact of the main connector is connected to the normally-open contact of the main connector, the common contact of the single-pole double-throw switch is connected to the normally-open contact of the single-pole double-throw switch.

With reference to the first aspect, in a first possible implementation manner, further includes the following. When the common contact of the main connector is not connected to the normally-open contact of the main connector, the common contact of the single-pole double-throw switch is connected to the normally-closed contact of the single-pole double-throw switch.

With reference to the first aspect or the first possible implementation manner of the first aspect, in a second possible implementation manner, the circuit further includes a single-pole single-throw switch, where the normally-open contact of the single-pole single-throw switch is connected to the normally-closed contact of the main connector by using the single-pole single-throw switch. When the common contact of the main connector is connected to the normally-open contact of the main connector, the single-pole single-throw switch is closed.

A second aspect provides an antenna interface circuit, including a main connector, a first single-pole double-throw switch, and a second single-pole double-throw switch, where a common contact of the main connector is used as a terminal of a main receiver. In this aspect, a normally-closed contact of the main connector is connected to a normally-closed contact of the first single-pole double-throw switch, and a common contact of the first single-pole double-throw switch is used as a terminal of a main antenna. Furthermore, a normally-open contact of the main connector is used as a terminal of an external antenna; a common contact of the second single-pole double-throw switch is used as a terminal of a diversity receiver; and a normally-closed contact of the second single-pole double-throw switch is used as a terminal of a diversity antenna. Additionally, a normally-open contact of the second single-pole double-throw switch is connected to a normally-open contact of the first single-pole double-throw switch; and when the common contact of the main connector is connected to the normally-open contact of the main connector, the common contact of the first single-pole double-throw switch is connected to the normally-open contact of the first single-pole double-throw switch, and the common contact of the second single-pole double-throw switch is connected to the normally-open contact of the second single-pole double-throw switch.

With reference to the second aspect, in a first possible implementation manner, further includes the following. When the common contact of the main connector is not connected to the normally-open contact of the main connector, the common contact of the first single-pole double-throw switch is connected to the normally-closed contact of the first single-pole double-throw switch, and the common contact of the second single-pole double-throw switch is connected to the normally-closed contact of the second single-pole double-throw switch.

A third aspect provides a Universal Mobile Telecommunications System data card, including any one of the foregoing antenna interface circuits.

A fourth aspect provides an antenna connection control method. The method includes detecting whether a main receiver is connected to an external antenna; and controlling, when the main receiver is connected to the external antenna, a diversity receiver to connect to a main antenna.

With reference to the fourth aspect, in a first possible implementation manner, the method further includes controlling, when the main receiver is not connected to the external antenna, the diversity receiver to connect to a diversity antenna.

A fifth aspect provides an antenna connection control apparatus, including the following. A detection unit, configured to detect whether a main receiver is connected to an external antenna; and a control unit, configured to control, when the main receiver is connected to the external antenna, a diversity receiver to connect to a main antenna.

With reference to the fifth aspect, in a first possible implementation manner, the control unit is further configured to control, when the main receiver is not connected to the external antenna, the diversity receiver to connect to a diversity antenna.

According to the antenna interface circuit provided in the first aspect, the antenna interface circuit provided in the second aspect, the Universal Mobile Telecommunications System data card provided in the third aspect, the antenna connection control method provided in the fourth aspect, or the antenna connection control apparatus provided in the fifth aspect, when a main receiver is connected to an external antenna, a diversity receiver is enabled to connect to a main antenna. Compared with a solution in which a diversity receiver is connected to a diversity antenna when a main receiver is connected to an external antenna in the prior art, by means of the solution provided in the embodiment of the present invention, a performance difference between antennas connected to a main receiver and a diversity receiver is reduced, thereby reducing a performance difference between the main receiver and the diversity receiver, and improving MIMO performance of a system.

BRIEF DESCRIPTION OF THE DRAWINGS

The drawings are provided to further understand the present invention, and they constitute a part of the application. The drawings, along with the embodiments of the present invention, are used to explain the present invention, and pose no limitation on the present invention. In the drawings.

DETAILED DESCRIPTION OF ILLUSTRATIVE EMBODIMENTS

To provide an implementation solution for improving MIMO performance of a system, embodiments of the present invention provide an antenna interface circuit, a Universal Mobile Telecommunications System data card, and an antenna connection control method and apparatus. Preferred embodiments of the present invention are described below with reference to the accompanying drawings, and it should be understood that the preferred embodiments described herein are merely used to describe and explain the present invention rather than to pose any limitation on the present invention. Embodiments in this application and features in the embodiments can be combined with each other without causing any conflict.

Embodiment 1

Figure 1:
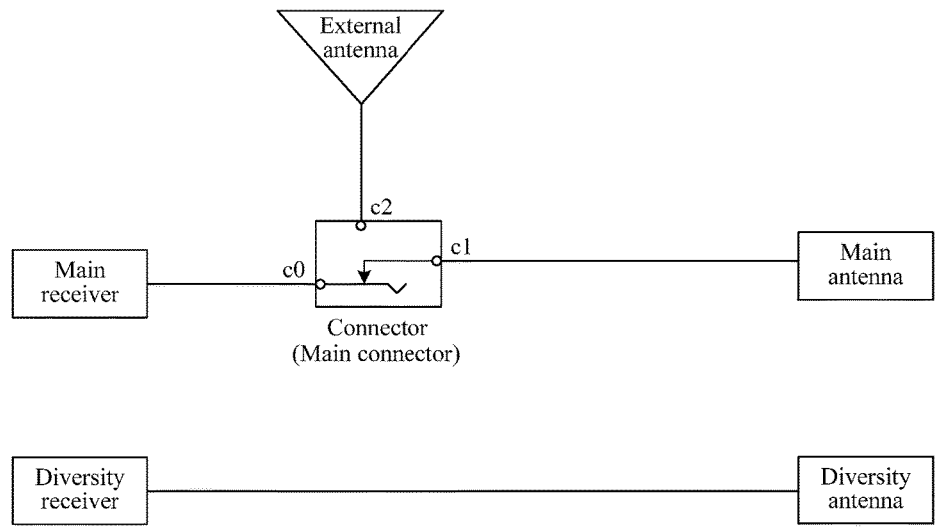
FIG. 1 is a schematic diagram of an antenna interface circuit in the prior art.
Figure 2:
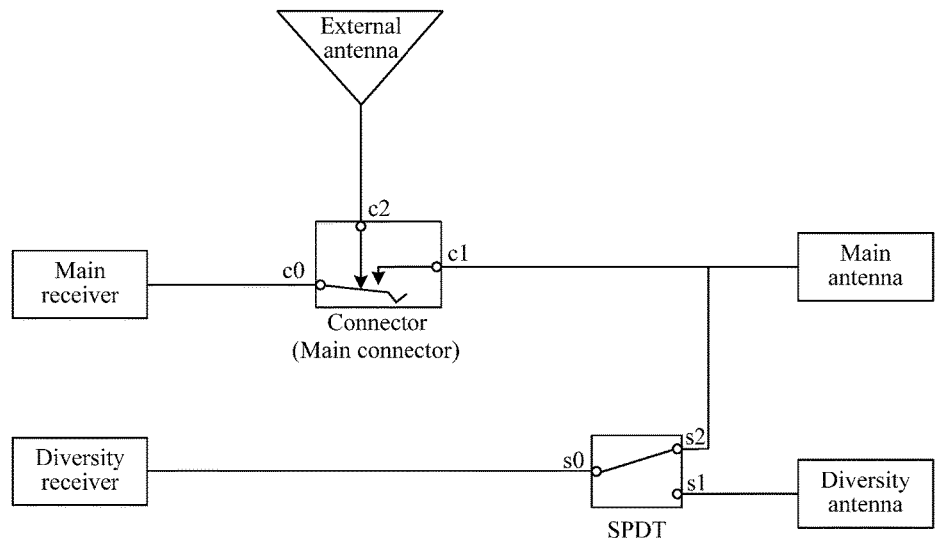
FIG. 2 is a first schematic diagram of an antenna interface circuit according to Embodiment 1 of the present invention.

Embodiment 1 of the present invention provides an antenna interface circuit, as shown in FIG. 2, including a main connector and a single-pole double-throw switch SPDT. In this embodiment, a common contact c0 of the main connector is used as a terminal of a main receiver; a normally-closed contact c1 of the main connector is used as a terminal of a main antenna; and a normally-open contact c2 of the main connector is used as a terminal of an external antenna. Furthermore, a common contact s0 of the single-pole double-throw switch SPDT is used as a terminal of a diversity receiver; a normally-closed contact s1 of the single-pole double-throw switch SPDT is used as a terminal of a diversity antenna; and a normally-open contact s2 of the single-pole double-throw switch SPDT is connected to the normally-closed contact c1 of the main connector. When the common contact c0 of the main connector is connected to the normally-open contact c2 of the main connector, the common contact s0 of the single-pole double-throw switch SPDT is connected to the normally-open contact s2 of the single-pole double-throw switch SPDT.

That is, when the main receiver is connected to the external antenna, the diversity receiver is connected to the main antenna. In this case, a circuit state is a state shown in FIG. 2.

It can be seen that, compared with a solution in which when a diversity receiver is still connected to a diversity antenna when a main receiver is connected to an external antenna in the prior art, by means of the solution in Embodiment 1 of the present invention, when a main receiver is connected to an external antenna, a diversity receiver is connected to a main antenna having a small performance difference from the external antenna, thereby reducing a performance difference between the main receiver and the diversity receiver, and improving MIMO performance of a system.

Figure 3:
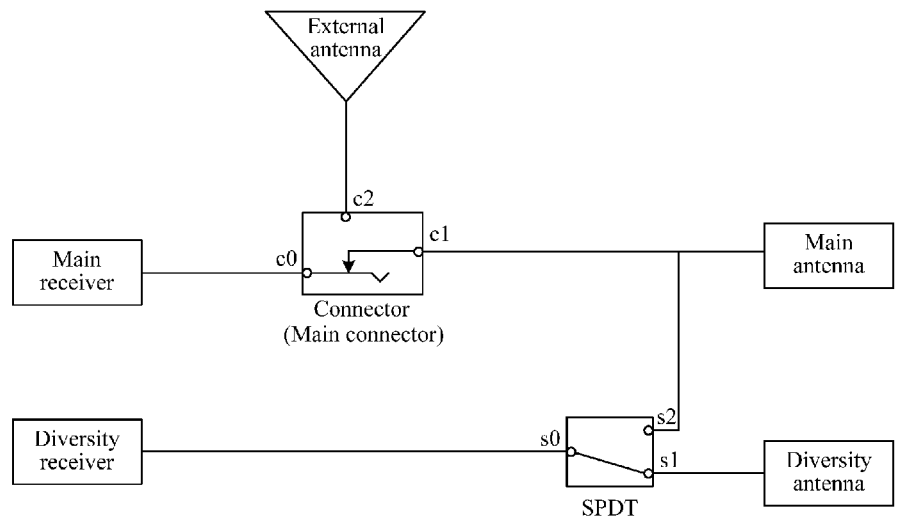
FIG. 3 is a second schematic diagram of an antenna interface circuit according to Embodiment 1 of the present invention.

Further, as shown in FIG. 3, when the common contact c0 of the main connector is not connected to the normally-open contact c2 of the main connector, the common contact s0 of the single-pole double-throw switch SPDT is connected to the normally-closed contact s1 of the single-pole double-throw switch SPDT.

That is, when the main receiver is not connected to the external antenna, but is connected to the main antenna, the diversity receiver is connected to the diversity antenna.

In a specific implementation, the antenna interface circuit in Embodiment 2 below may also be used to prevent a connection cable from becoming excessive long to affect performance of the main antenna.

Embodiment 2

Figure 4:
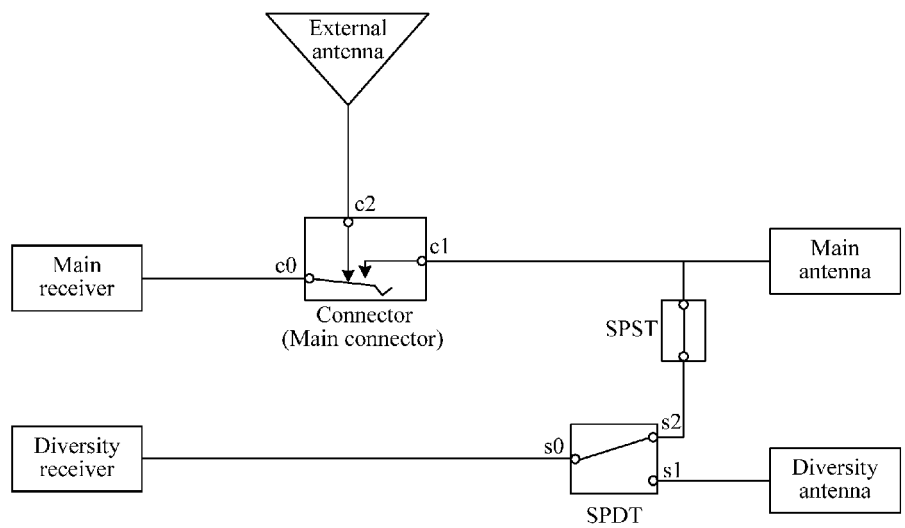
FIG. 4 is a first schematic diagram of an antenna interface circuit according to Embodiment 2 of the present invention.

An antenna interface circuit provided in Embodiment 2 of the present invention is shown in FIG. 4, and further includes, on the basis of the antenna interface circuit provided in the foregoing Embodiment 1, a single-pole single-throw switch SPST, where the normally-open contact s2 of the single-pole double-throw switch SPST is connected to the normally-closed c1 of the main connector by using the single-pole single-throw switch SPST. When the common contact c0 of the main connector is connected to the normally-open contact c2 of the main connector, the single-pole single-throw switch SPST is closed.

That is, when the main receiver is connected to the external antenna, the common contact s0 of the single-pole double-throw switch SPDT is connected to the normally-open contact s2 of the single-pole double-throw switch SPDT, and the single-pole single-throw switch SPST is closed, so as to implement that a diversity receiver is connected to a main antenna. In this case, a circuit state is a state shown in FIG. 4.

Figure 5:
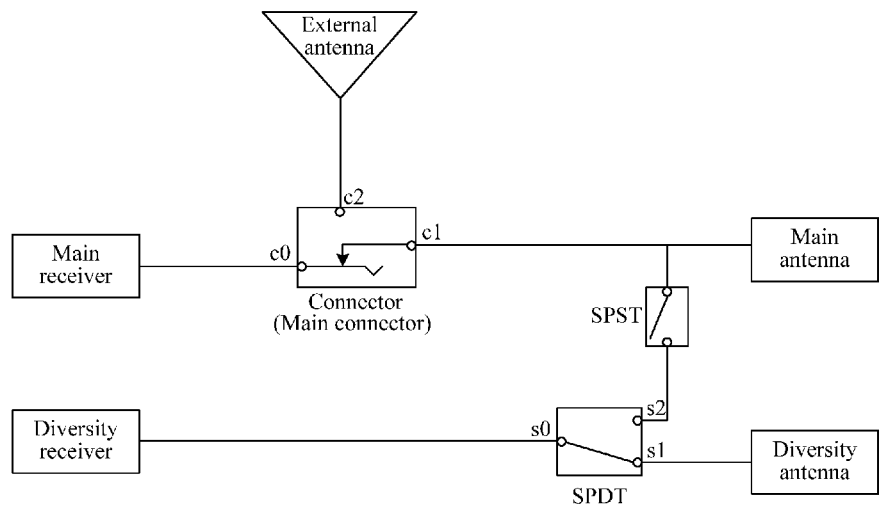
FIG. 5 is a second schematic diagram of an antenna interface circuit according to Embodiment 2 of the present invention.

Further, when the common contact c0 of the main connector is not connected to the normally-open contact c2 of the main connector, the common contact s0 of the single-pole double-throw switch SPDT is connected to the normally-closed contact s1 of the single-pole double-throw switch SPDT, the single-pole single-throw switch SPST may be closed, and preferably, the single-pole single-throw switch SPST is open. In this case, a circuit state is a state shown in FIG. 5.

That is, when the main receiver is not connected to the external antenna, but is connected to the main antenna, the diversity receiver is connected to the diversity antenna.

Compared with the foregoing Embodiment 1, by means of the antenna interface circuit provided in Embodiment 2 of the present invention, MIMO performance of a system can also be improved, and a connection cable can be divided by means of an added single-pole single-throw switch SPST to prevent the connection cable from becoming excessive long to affect performance of a main antenna.

Embodiment 3

Figure 6:
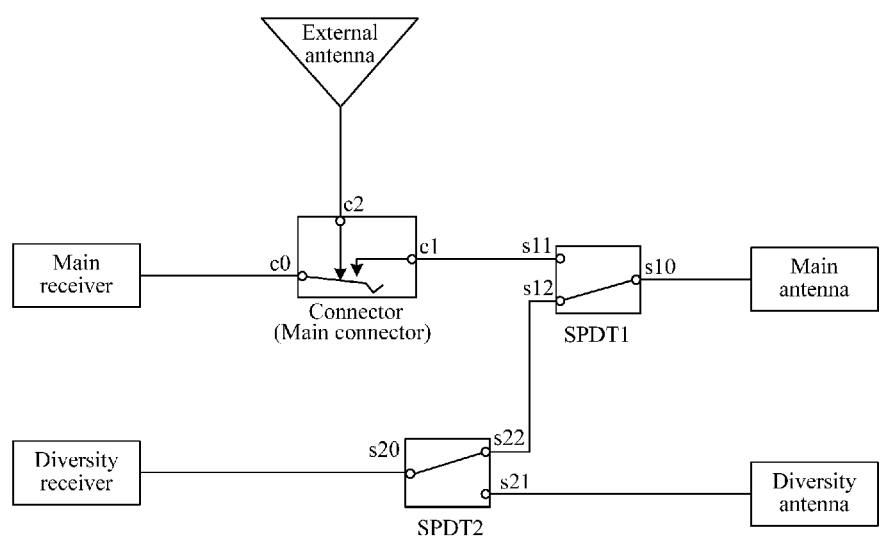
FIG. 6 is a first schematic diagram of an antenna interface circuit according to Embodiment 3 of the present invention.

Embodiment 3 of the present invention further provides an antenna interface circuit, and as shown in FIG. 6, includes a main connector, a first single-pole double-throw switch SPDT 1, and a second single-pole double-throw switch SPDT 2. In this embodiment, a common contact c0 of the main connector is used as a terminal of a main receiver; and a normally-closed contact c1 of the main connector is connected to a normally-closed contact s11 of the first single-pole double-throw switch SPDT 1, and a common contact s10 of the first single-pole double-throw switch SPDT 1 is used as a terminal of a main antenna. Furthermore, in this embodiment, a normally-open contact c2 of the main connector is used as a terminal of an external antenna; a common contact s20 of the second single-pole double-throw switch SPDT 2 is used as a terminal of a diversity receiver; and a normally-closed contact s21 of the second single-pole double-throw switch SPDT 2 is used as a terminal of a diversity antenna. Additionally, a normally-open contact s22 of the second single-pole double-throw switch SPDT 2 is connected to a normally-open contact s12 of the first single-pole double-throw switch SPDT 1. When the common contact c0 of the main connector is connected to the normally-open contact c2 of the main connector, the common contact s10 of the first single-pole double-throw switch SPDT 1 is connected to the normally-open contact s12 of the first single-pole double-throw switch SPDT 1, and the common contact s20 of the second single-pole double-throw switch SPDT 2 is connected to the normally-open contact s22 of the second single-pole double-throw switch SPDT 2.

That is, when the main receiver is connected to the external antenna, the diversity receiver is connected to the main antenna. In this case, a circuit state is a state shown in FIG. 6.

Figure 7:
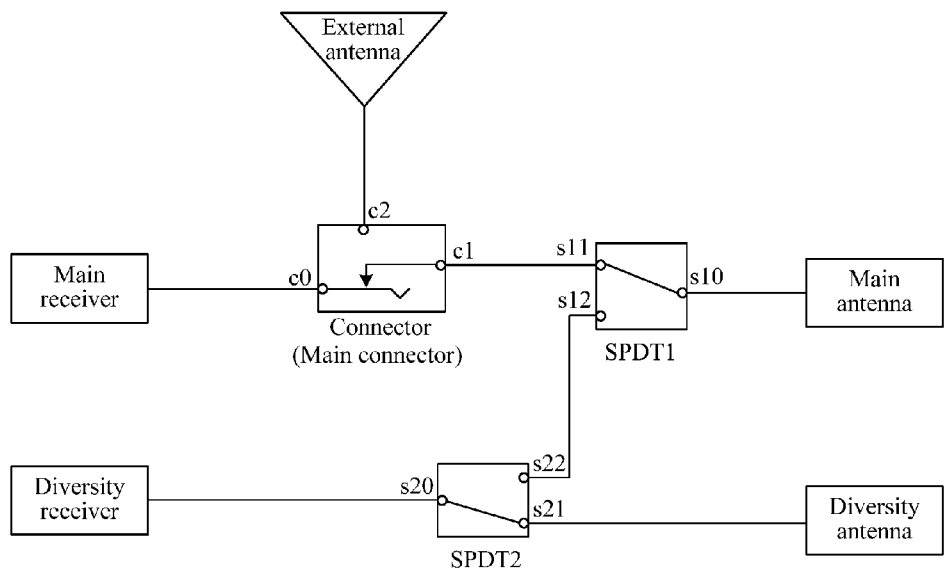
FIG. 7 is a second schematic diagram of an antenna interface circuit according to Embodiment 3 of the present invention.

Further, as shown in FIG. 7, when the common contact c0 of the main connector is not connected to the normally-open contact c2 of the main connector, the common contact s10 of the first single-pole double-throw switch SPDT 1 is connected to the normally-closed contact s11 of the first single-pole double-throw switch SPDT 1, and the common contact s20 of the second single-pole double-throw switch SPDT 2 is connected to the normally-closed contact s21 of the second single-pole double-throw switch SPDT 2.

That is, when the main receiver is not connected to the external antenna, but is connected to the main antenna, the diversity receiver is connected to the diversity antenna.

It can be seen that the antenna interface circuit provided in Embodiment 3 of the present invention and the foregoing Embodiment 2 have a same principle, and can also achieve a same technical effect.

The antenna interface circuit in any one of Embodiment 1 to Embodiment 3 may be applied to multiple types of communications products to improve product performance.

Embodiment 4

Embodiment 4 of the present invention provides a Universal Mobile Telecommunications System data card, including the antenna interface circuit in any one of the foregoing Embodiment 1 to Embodiment 3.

Embodiment 5

Figure 8:
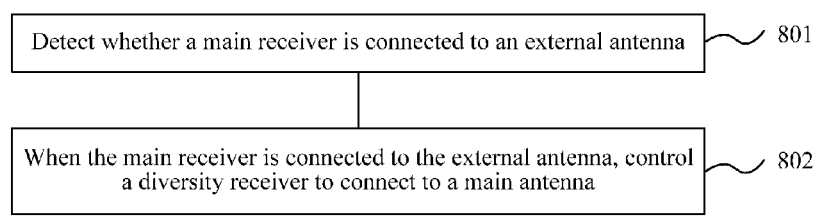
FIG. 8 is a schematic flowchart of an antenna connection control method according to Embodiment 5 of the present invention.

Embodiment 5 of the present invention provides an antenna connection control method, as shown in FIG. 8, including the following.

Step 801: Detect whether a main receiver is connected to an external antenna.

Step 802: Control, when the main receiver is connected to the external antenna, a diversity receiver to connect to a main antenna.

Further, the antenna connection control method further includes controlling, when the main receiver is not connected to the external antenna, the diversity receiver to connect to a diversity antenna.

That is, in the antenna connection control method provided in Embodiment 5 of the present invention, it is detected and determined whether a main receiver is connected to an external antenna, and an antenna connected to a diversity receiver is determined according to an antenna connected to the main receiver, so as to reduce a performance difference between the main receiver and the diversity receiver by reducing a performance difference between the antennas connected to the main receiver and the diversity receiver, thereby improving MIMO performance of a system.

Embodiment 6

Figure 9:
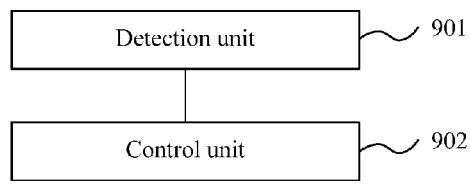
FIG. 9 is a schematic structural diagram of an antenna connection control apparatus according to Embodiment 6 of the present invention.

Based on a same inventive concept, according to the antenna connection control method provided in the foregoing Embodiment 5 of the present invention, correspondingly, Embodiment 6 of the present invention further provides an antenna connection control apparatus whose schematic structural diagram is shown in FIG. 9, specifically including a detection unit 901, configured to detect whether a main receiver is connected to an external antenna; and a control unit 902, configured to control, when the main receiver is connected to the external antenna, a diversity receiver to connect to a main antenna.

Further, the control unit 902 is further configured to control, when the main receiver is not connected to the external antenna, the diversity receiver to connect to a diversity antenna.

In conclusion, MIMO performance of a system can be improved by means of the solutions provided in the embodiments of the present invention.

Persons skilled in the art should understand that, although some preferred embodiments of the present invention have been described, the persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A circuit, comprising:
    a main connector having a common contact, a normally-closed contact, and a normally-open contact; and
    a single-pole double-throw switch having a common contact, a normally-closed contact, and a normally-open contact, wherein:
        the common contact of the main connector is used as a terminal of a main receiver;
        the normally-closed contact of the main connector is used as a port of a main antenna;
        the normally-open contact of the main connector is used as a port of an external antenna;
        the common contact of the single-pole double-throw switch is used as a port of a diversity receiver;
        the normally-closed contact of the single-pole double-throw switch is used as a port of a diversity antenna; and
        the normally-open contact of the single-pole double-throw switch is connected to the normally-closed contact of the main connector.

2. The circuit according to claim 1, wherein when the common contact of the main connector is connected to the normally-open contact of the main connector, the common contact of the single-pole double-throw switch is connected to the normally-open contact of the single-pole double-throw switch.

3. The circuit according to claim 2, wherein the diversity antenna is communicatively decoupled from the diversity receiver.

4. The circuit according to claim 1, wherein when the common contact of the main connector is not connected to the normally-open contact of the main connector, the common contact of the single-pole double-throw switch is connected to the normally-closed contact of the single-pole double-throw switch.

5. The circuit according to claim 4, wherein the common contact of the main connector is connected to the normally-closed contact of the main connector.

6. The circuit according to claim 4, wherein the diversity receiver is communicatively decoupled from the main antenna.

7. The circuit according to claim 1, further comprising a single-pole single-throw switch arranged between the main antenna and the normally-open contact of the single-pole double-throw switch, wherein the normally-open contact of the single-pole double-throw switch is connected to the normally-closed contact of the main connector via the single-pole single-throw switch, and wherein the single-pole single-throw switch is closed when the common contact of the main connector is connected to the normally-open contact of the main connector.

8. A circuit, comprising:
    a main connector comprising a first single-pole double-throw switch and a second single-pole double-throw switch, wherein:
        a common contact of the main connector is coupled to a port of a main receiver;
        a normally-open contact of the main connector is coupled to a port of an external antenna;
        a normally-closed contact of the main connector is connected to a normally-closed contact of the first single-pole double-throw switch, and a common contact of the first single-pole double-throw switch is coupled to a port of a main antenna;
        a common contact of the second single-pole double-throw switch is coupled to a port of a diversity receiver;
        a normally-closed contact of the second single-pole double-throw switch is coupled to a port of a diversity antenna;
        a normally-open contact of the second single-pole double-throw switch is connected to a normally-open contact of the first single-pole double-throw switch; and
        when the common contact of the main connector is connected to the normally-open contact of the main connector, the common contact of the first single-pole double-throw switch is connected to the normally-open contact of the first single-pole double-throw switch, and the common contact of the second single-pole double-throw switch is connected to the normally-open contact of the second single-pole double-throw switch.

9. The circuit according to claim 8, wherein when the common contact of the main connector is not connected to the normally-open contact of the main connector, the common contact of the first single-pole double-throw switch is connected to the normally-closed contact of the first single-pole double-throw switch, and the common contact of the second single-pole double-throw switch is connected to the normally-closed contact of the second single-pole double-throw switch.

10. A data card comprising:
    an antenna interface circuit comprising a main connector and a single-pole double-throw switch, wherein:
        a common contact of the main connector is used as a terminal of a main receiver;
        a normally-closed contact of the main connector is used as a port of a main antenna;
        a normally-open contact of the main connector is used as a port of an external antenna;

a common contact of the single-pole double-throw switch is used as a port of a diversity receiver;

a normally-closed contact of the single-pole double-throw switch is used as a port of a diversity antenna;

a normally-open contact of the single-pole double-throw switch is connected to the normally-closed contact of the main connector; and when the common contact of the main connector is connected to the normally-open contact of the main connector, the common contact of the single-pole double-throw switch is connected to the normally-open contact of the single-pole double-throw switch.

11. The data card according to claim 10, wherein when the common contact of the main connector is not connected to the normally-open contact of the main connector, the common contact of the single-pole double-throw switch is connected to the normally-closed contact of the single-pole double-throw switch.

12. The data card according to claim 10, wherein the antenna interface circuit further comprises a single-pole single-throw switch, wherein the normally-open contact of the single-pole double-throw switch is connected to the normally-closed contact of the main connector via the single-pole single-throw switch, and wherein when the common contact of the main connector is connected to the normally-open contact of the main connector, the single-pole single-throw switch is closed.

13. A method, comprising:
determining whether a main receiver is connected to an external antenna through a connector; and
controlling, based on the determination, a connection between a diversity receiver and a main antenna using a single-pole double-throw switch, wherein the connector isolates the external antenna from the diversity receiver when the diversity receiver is connected to the main antenna.

14. The method according to claim 13, further comprising:
controlling the single-pole double-throw switch to connect the diversity receiver to a diversity antenna, different from the main antenna, when the main receiver is not connected to the external antenna.

15. The method according to claim 14, wherein the main receiver is coupled to the main antenna.

16. The method according to claim 13, further comprising:
controlling the single-pole double-throw switch to couple the diversity receiver to the main antenna when the main receiver is connected to the external antenna.

17. An apparatus, comprising:
a detector configured to detect whether a main receiver is connected to an external antenna; and
a controller configured to control, when the main receiver is connected to the external antenna, a diversity receiver to connect to a main antenna through a single-pole double-throw switch, wherein the single-pole double-throw switch does not provide a connection path between the diversity receiver and the external antenna.

18. The apparatus according to claim 17, wherein the controller is further configured to control, when the main receiver is not connected to the external antenna, the single-pole double-throw switch to connect to the diversity receiver and a diversity antenna.

* * * * *